United States Patent [19]

Slusser

[11] 3,915,233
[45] Oct. 28, 1975

[54] WELL ACIDIZING PROCESS
[75] Inventor: Marion L. Slusser, Arlington, Tex.
[73] Assignee: Mobil Oil Corporation, New York, N.Y.
[22] Filed: Sept. 27, 1973
[21] Appl. No.: 401,325

Related U.S. Application Data
[63] Continuation-in-part of Ser. No. 139,950, May 3, 1971.

[52] U.S. Cl. ................................................ 166/307
[51] Int. Cl. ........................ E21b 43/16; E21b 43/25
[58] Field of Search ............ 166/271, 273, 282, 307

[56] References Cited
UNITED STATES PATENTS

| | | | |
|---|---|---|---|
| 1,891,667 | 12/1932 | Carr | 166/307 |
| 2,796,936 | 6/1957 | Sayre et al. | 166/307 |
| 3,167,123 | 1/1965 | Graham et al. | 166/307 |
| 3,254,718 | 6/1966 | Dunlap | 166/307 |
| 3,343,602 | 9/1967 | Knox et al. | 166/307 |
| 3,481,404 | 12/1969 | Gidley | 166/307 |
| 3,648,775 | 3/1972 | Dixon | 166/307 |
| 3,648,776 | 3/1972 | Dixon | 166/307 |
| 3,712,380 | 1/1973 | Caffey | 166/307 |
| 3,756,319 | 9/1973 | Holm et al. | 166/307 |

*Primary Examiner*—Ernest R. Purser
*Assistant Examiner*—Jack E. Ebel
*Attorney, Agent, or Firm*—C. A. Huggett; Henry L. Ehrlich

[57] ABSTRACT

This specification discloses a process of acidizing a subsurface formation, which formation is penetrated by a well extending from the surface of the earth. In accordance with this process, an amphipathic solvent is injected via the well into the formation. Thereafter, an aqueous solution of an acid is injected via the well into the formation to dissolve a portion of the formation. Subsequently, a fluid that is nonmiscible with the aqueous solution of the acid is injected via the well into the formation.

10 Claims, No Drawings

WELL ACIDIZING PROCESS

CROSS REFERENCE TO RELATED APPLICATION

This is a continuation-in-part of application Ser. No. 139,950, filed May 3, 1971.

BACKGROUND OF THE INVENTION

This invention relates to the treatment of subsurface formations. More particularly, this invention relates to the acid treatment of subsurface formations to improve the permeability of the formation.

Various processes have been employed in the treatment of subsurface formations to improve the permeability thereof. Commonly employed processes involve the injection of aqueous solutions of acid into the formation to dissolve a portion of the formation and thereby increase the permeability of the formation in the vicinity of a well which penetrates the formation. Formations generally referred to as calcareous and carbonate formations such as limestone, dolomite and anhydrite formations as well as siliceous formations have been treated with aqueous solutions of acid. Hydrochloric acid is commonly employed in the treatment of carbonate formations, and mud acid which is comprised of a mixture of hydrochloric and hydrofluoric acids is commonly employed in the treatment of siliceous formations.

A process of acidizing subterranean calcareous formations is described in U.S. Pat. No. 3,254,718 to Peggy M. Dunlap. In accordance with Dunlap, an amphipathic solvent is passed into the formation from a well leading to the formation. The amphipathic solvent replaces the petroleum and water contained in a portion of the formation invaded by the amphipathic solvent. Thereafter, an aqueous solution of an acid is passed into the formation. This solution of acid displaces the amphipathic solvent and contacts the walls of the interstices of the formation and reacts with the minerals of the formation to improve the permeability of the formation. Lastly, petroleum is flowed from the formation into the well leading to the formation.

A method of acidizing sandstones and other siliceous formations to overcome formation damage and improve the permeability is described in U.S. Pat. No. 3,481,404 to John L. Gidley et al. In accordance with Gidley, there is injected into the formation an aqueous solution of hydrochloric acid, hydrofluoric acid, or a mixture of hydrochloric and hydrofluoric acids and this is followed by the injection into the formation of a hydrocarbon oil and a solvent miscible with oil and water as an afterflush.

The treatment of a subsurface formation by injecting an aqueous solution of acid via a well into the formation usually results in increasing the permeability of the formation in the vicinity of the well. However, often this increase in permeability is less than is expected and in some cases no increase in permeability is realized and even a decrease in permeability results. It is thought that the acid treatment of a formation results in the precipitation of inorganic and organic precipitates which clog the porous matrix of the formation thereby causing some formation damage. These precipitates may be more flocculent and of gel structure as compared to the rock material of the formation prior to being dissolved in the acid. Such inorganic precipitates as calcium sulfate, ferrous hydroxide, calcium fluoride and sodium and potassium fluorosilicates may be formed.

In addition, the acid treatment of a formation may result in formation damage by converting the formation from a water-wet to an oil-wet state with a corresponding reduction in the effective permeability of the formation to oil. This type of damage may occur when an amphipathic solvent or mutual solvent for oil and water is used in conjunction with the acid treatment of a formation. Such a solvent when injected into a formation renders that portion of the formation invaded by the solvent susceptible to being preferentially wetted by whatever liquid next contacts that portion of the formation. Should oil be the liquid which next contacts that portion of a formation invaded by the amphipathic solvent, then that portion of the formation will be converted to an oil-wet state with a subsequent reduction in the effective permeability of the formation to oil.

SUMMARY OF THE INVENTION

This invention provides a method of treating a subsurface formation that is penetrated by a well which extends from the surface of the earth. In accordance with this method, an amphipathic solvent is injected into the formation. Thereafter, an aqueous solution of an acid is injected into the formation. Subsequently a fluid which has a viscosity less than the viscosity of the aqueous solution of the acid is injected into the formation.

In a preferred embodiment of this invention, there is injected into the formation a solution of ethylene glycol monobutyl ether in an amount sufficient to fill a radial zone of the formation from about 1 to 10 feet around the well. Thereafter, an aqueous solution of acid is injected into the formation in an amount sufficient to displace the ethylene glycol monobutyl ether into a cylindrical ring of no greater than 1 foot in thickness surrounding the radial zone of the formation. Thereafter, a fluid having a viscosity less than the viscosity of the aqueous solution of the acid is injected into the formation to displace the acid into the formation.

DESCRIPTION OF THE PREFERRED EMBODIMENTS

In accordance with the method of this invention, a subsurface formation is treated by injecting an amphipathic solvent thereinto via a well extending from the surface of the earth. Thereafter, an aqueous solution of an acid is injected via the well into the formation and subsequently a nonmiscible fluid is injected via the well into the formation.

In accordance with an embodiment of this invention, a subsurface formation containing hydrocarbons and water is treated by injecting an amphipathic solvent thereinto to displace the hydrocarbons and water from at least a portion of the formation in the vicinity of the well. This portion of the formation that is invaded by the amphipathic solvent is thereby converted to a condition whereby it is susceptible to being wetted by whatever type liquid, water or oil, that next contacts the formation. Subsequently, there is injected into the formation an aqueous solution of an acid, which acid invades the portion of the formation previously invaded by the amphipathic solvent. Because the amphipathic solvent has previously displaced the hydrocarbons and water from that portion of the formation into which the aqueous solution of the acid flows, the acid is able to better contact the matrix walls making up the formation and thereby more effectively dissolve the formation. In addition, the aqueous solution of the acid in contacting the matrix walls of the formation converts that portion to a water-wet state and thereby improves the effective permeability of the formation to the flow of hydrocarbons in the presence of mixtures of hydrocarbons and water. Thereafter, a nonmiscible fluid is injected into the formation. By the term "nonmiscible fluid" is meant a fluid that is immiscible with the aqueous solution of the acid. Preferably this nonmiscible fluid is injected into the formation immediately after the injection of the aqueous solution of an acid into the formation to displace the aqueous solution of an acid from the zone surrounding the well prior to the acid becoming spent by reaction with minerals of the formation. This mitigates formation damage in the zone surrounding the well resulting from the precipitation of insoluble precipitates as the acid becomes spent. In addition, this nonmiscible fluid channels through the portion of the formation previously invaded by the aqueous solution of the acid, thereby forming channels, streaks, or fingers which extend from the well through the acidized zone. These streaks exhibit higher effective permeability to hydrocarbons than does the remainder of the acidized zone and thus increase the effective permeability of the formation.

In a preferred embodiment a nonmiscible fluid is employed which has a viscosity less than the viscosity of the aqueous solution of an acid. Such a fluid enhances the development of channels, streaks, or fingers that extend through the acidized zone and thereby enhance the effective permeability of the formation to the nonmiscible phase. An oil that has a viscosity less than the viscosity of the aqueous solution of the acid is a preferred fluid to employ when the hydrocarbons contained in the reservoir are liquid hydrocarbons, referred to as petroleum. Examples of such oils that may be employed are diesel oil, kerosene, and LPG. An oil having a lower viscosity than the aqueous solution of the acid readily channels through the acid filled water-wet formation and forms oil filled channels which exhibit relatively high effective permeability to petroleum. These channels extend from the well into the formation beyond the treated zone. The oil injected from the well into the formation enters the formation uniformly through the vertical face exposed to the well and thereby initiates in the formation permeable oil filled channels which extend uniformly from the well through the formation. Upon putting the well on production, the hydrocarbons contained in the untreated formation readily displace the oil from the oil filled channels and flow through these high permeability channels into the well. When the hydrocarbons contained in the formation are primarily gaseous hydrocarbons, it is preferred to employ gas as the nonmiscible fluid that is injected into the formation. Natural gas and nitrogen are preferred gases to employ because they are normally readily available at the well site.

A sufficient volume of nonmiscible fluid is injected into the formation to ensure the development of streaks or fingers that extend through the acidized zone. This volume varies with the formation characteristics such as permeability variations within the formation and with the relationship between the viscosity of the aqueous solution of the acid and the viscosity of the nonmiscible fluid. The greater the difference between these viscosities, the greater the tendency there is for the nonmiscible fluid to develop streaks which extend through the acidized zone and the lesser the amount of nonmiscible fluid which is required to be injected into the formation.

It is preferred that a pressure less than the pressure required to fracture the formation be employed in injecting into the formation the amphipathic solvent, the aqueous solution of the acid, and the nonmiscible fluid. Such a pressure ensures more uniform invasion of the formation by the injected fluids and consequently a greater increase in the effective permeability of the formation than would be the case if a pressure sufficient to fracture the formation was employed.

The aqueous solutions of acids employed in carrying out this invention are those acids commonly employed in acidizing formations. For example, hydrochloric acid is commonly employed in acidizing carbonate formations and a mixture of hydrochloric and hydrofluoric acids is commonly employed in acidizing siliceous formations.

By amphipathic solvent is meant a solvent which is at least partially miscible with petroleum in the formation or with a solvent for petroleum and which is at least partially miscible with water. Such a solvent has mutual solubility for oil and water.

Amphipathic solvents found to be useful in carrying out this invention are those solvents listed in U.S. Pat. No. 3,131,759 to Marion L. Slusser, and include:

Methyl alcohol,
Ethyl alcohol,
Propyl alcohol,
Isopropyl alcohol,
n-Butyl alcohol,
Isobutyl alcohol,
Tertiary butyl alcohol,
2-pentyl alcohol,
Tertiary amyl alcohol,
Dichloro tertiary butyl alcohol,
Allyl alcohol,
Ethylene glycol,
Propylene glycol,
Diethylene glycol,
Butyl glycol,
Tetraethylene glycol,
Dipropylene glycol,
Tripropylene glycol,
Dioxane,
Ethylene glycol monomethyl ether,
Ethylene glycol monoethyl ether,
Ethylene glycol monopropyl ether,
Ethylene glycol monobutyl ether,
Ethylene glycol monophenyl ether,
Propylene glycol methyl ether,
Diethylene glycol n-butyl ether,
Dipropylene glycol monomethyl ether,
Tripropylene glycol monomethyl ether,
Ethylene glycol dimethyl ether,
Diethylene glycol dimethyl ether,
Triethylene glycol dimethyl ether,
Tetraethylene glycol dimethyl ether,
Glycerol triacetate,
Methyl acetate,
Diethylene glycol monoethyl ether,
Methyl acetoacetate,
Acetone,
Methyl ethyl ketone
Trichloro acetaldehyde (chloral), Pyridine, and Acrylaldehyde (acrolein).

Of these solvents, it is preferred to employ ethylene glycol monobutyl ether. Ethylene glycol monobutyl ether has a high solvency for oil, and is reasonably priced and readily available in the quantities needed for this application.

The volume of the aqueous solution of an acid to be injected into the formation is a volume sufficient to fill the pore space of a formation being treated within a predetermined distance from the well. In the case of a radial flow pattern this volume is the volume sufficient to fill the pore space of a cylindrical volume of predetermined radium $r_a$ about the well. This volume of acid may be calculated in accordance with the formula (1) below:

$$V_a = \pi r_a^2 h \phi \qquad (1)$$

where $V_a$ = volume or amount of acid in cubic feet, $\pi = 3.1416$, $r_a$ = radius in feet measured from the longitudinal axis of the well of the cylindrical volume of formation to be filled with acid, $h$ = the vertical height in feet of the formation to be acidized, and $\phi$ = porosity of the formation.

In this formula, the radius of the well is considered to be negligible and is not accounted for.

The volume of amphipathic solvent to be injected into the formation depends upon the characteristics of the formation and the radial distance from the well that the formation is to be acidized. In a preferred embodiment of this invention, a sufficient volume of amphipathic solvent is injected into the formation which, when displaced into the formation by the subsequently injected aqueous solution of an acid, will fill a cylindrical ring of the formation about the acid having a thickness of 1 foot or less.

This preferred volume of amphipathic solvent may be calculated in accordance with formula (2) below:

$$V_s = \pi h \phi (r_s^2 - r_a^2) \qquad (2)$$

where:

$r_s$ is greater than $r_a$ but no greater than $r_a + 1$.

This preferred volume of amphipathic solvent ensures that a sufficient volume of solvent is injected into the formation to displace the hydrocarbons and water from the zone of the formation which is to be acidized with a minimal excess of amphipathic solvent.

When liquid hydrocarbons are present in the formation it is advantageous, as it was in Dunlap's process, to inject into the formation a hydrocarbon solvent for the liquid hydrocarbons prior to the injection of the amphipathic solvent into the formation. In accordance with an embodiment of this invention, a hydrocarbon solvent for the liquid hydrocarbons in the formation is passed into the formation prior to the amphipathic solvent. The hydrocarbon solvent passed into the formation will have miscibility with the liquid hydrocarbons contained within the formation. Further, the solvent will have miscibility with the amphipathic solvent thereafter injected into the formation. Thus, the hydrocarbon solvent, upon passage into the formation, will displace the liquid hydrocarbons from the formation and will occupy the space previously occupied by the petroleum. This solvent will thereafter be displaced from its position within the formation by the amphipathic solvent ppassed into the formation. A particular advantage of passing a hydrocarbon solvent into the formation prior to the amphipathic solvent is that the liquid hydrocarbons are more readily and more nearly completely removed from the formation and are replaced by the amphipathic solvent.

The hydrocarbon solvent for the liquid hydrocarbons in the formation is preferably a fraction of crude oil which contains a relatively large amount of aromatic hydrocarbons. A suitable fraction of this sort is a catalytic reformate or a cycle stock from thermal or catalytic cracking of a gas-oil fraction. The hydrocarbon solvent may be a virgin naphtha or gas-oil fraction. It may also be a crude oil having a high gravity. The solvent may also be an aromatic fraction obtained as a product of the carbonization of coal or may be benzene or an alkyl benzene such as toluene, xylene, trialkyl substituted benzene, or tetra alkyl substituted benzene. In general, the hydrocarbon solvent should boil in the range between 80° and 250° C. and should have a viscosity not above 350 Saybolt Universal seconds at 100° F.

The amount of the hydrocarbon solvent for the petroleum passed into the formation should be in the range between about 1 percent and 20 percent of the hydrocarbon pore volume of the portion of the formation to be acidized.

In accordance with another embodiment, prior to the injection into the formation of an amphipathic solvent, ethylene glycol monobutyl ether being a preferred amphipathic solvent, there is injected into the well water in an amount sufficient to kill the well, i.e., to essentially cease the production of fluid from the formation into the well and in a further amount sufficient to reduce the oil saturation in the formation for a distance of at least 2 feet surrounding the well. The water which invades the formation around the well reduces the oil saturation in the formation and enables the amphipathic solvent to be more effective in making this portion of the formation water-wet. Materials for lowering interfacial tension, such as amphipathic solvents and surfactants may be added to the water to further aid in reducing the oil saturation in the formation surrounding the well.

FIELD TESTS

Field tests have been carried out of this invention in an active oil field. Two separate tests were carried out using separate wells that penetrated a subsurface formation that contained liquid hydrocarbons. It was considered that both of these wells had been damaged prior to the treatment in accordance with the invention. After treatment, oil production in the first well was increased by 33⅓ percent from 15 to 20 barrels of oil per day and water production was decreased by about 50 percent to about 168 barrels of water per day. Oil production in the second well after treatment was increased 400 percent from 2 to 8 barrels of oil per day.

The treatment was carried out by injecting via a well ethylene glycol monobutyl ether into the formation in an amount of 10 gallons per foot of formation (1.34 ft³/ft), followed by 100 gallons per foot of formation (13.36 ft³/ft) of acid (injected as 50 gallons per foot of 15 percent HCl and 50 gallons per foot of 3 percent mud acid), and followed by 140 gallons per foot of formation (18.71 ft³/ft) of diesel oil. Thus, the total treatment volume was 250 gallons/foot (33.41 ft³/ft).

The ethylene glycol monobutyl ether that was injected via the well into the formation was sufficient to fill a radial zone of the formation for about 1.19 feet around the well as calculated using a general form of equation (1). The porosity of the formation was 30 percent.

$V = \pi \phi h r^2$
1.34 = 3.1416 × 0.3 × 1.0 × $r^2$
$r$ = 1.19 feet of ethylene glycol monobutyl ether.

The acid injected into the formation displaced the ethylene glycol monobutyl ether into a cylindrical ring of about 0.18 foot thick as shown below:

A. The penetration of the ethylene glycol monobutyl ether into the formation after the injection of acid into the formation was calculated to be about 3.95 feet.

Volume of ethylene glycol monobutyl
  ether injected ............................... 1.34 ft³/ft
Volume of acid injected ..................... 13.36 ft³/ft Total ..................................... 14.70 ft³/ft.

$V = \pi \phi h r^2$
14.70 ft³ = 3.1416 × 0.3 × 1.0 × $r^2$
$r$ = 3.95 ft.

B. The penetration of the acid into the formation was calculated to be 3.77 ft.

$V = \pi \phi h r^2$
13.36 ft³ = 3.1416 × 0.3 × 1.0 × $r^2$
$r$ = 3.77 ft.

C. The thickness of the cylindrical ring of ethylene glycol monobutyl ether surrounding the acid at the end of the acid injection was calculated to be 0.18 foot.

Thickness of ethylene glycol monobutyl ether ring
    = A−B = 3.95 ft. − 3.77 ft = 0.18 foot.

Following the injection of the acid there was injected 140 gallons of diesel oil having a viscosity of less than the viscosity of the acid into the formation. The diesel oil injected into the formation in conjunction with the determined volumes of ethylene glycol monobutyl ether was considered to develop streaks of diesel oil which extended through the acid in the formation.

I claim:

1. A method of treating a subsurface formation penetrated by a well extending from the surface of the earth, comprising the steps of:
   a. injecting ethylene glycol monobutyl ether via said well into said formation in an amount sufficient to fill a radial zone of the formation from about one to ten feet around said well;
   b. injecting a fluid consisting essentially of an aqueous solution of an acid via said well into said formation in an amount sufficient to displace said ethylene glycol monobutyl ether into a cylindrical ring of no greater than one foot in thickness surrounding said aqueous solution of an acid to water-wet said formation from which said ethylene glycol monobutyl ether was displaced; and
   c. injecting an oil that is immiscible with and less viscous than said aqueous solution of an acid via said well into said formation in a sufficient amount to develop oil-filled water-wet channels which extend from the well beyond the water-wet acidized and the ethylene glycol monobutyl ether filled zones.

2. The method of claim 1 wherein said aqueous solution of an acid is an aqueous solution of hydrochloric acid.

3. The method of claim 1 wherein said aqueous solution of an acid is an aqueous solution of mud acid comprised of a mixture of hydrochloric acid and hydrofluoric acid.

4. The method of claim 1 wherein prior to step (a) there is injected into said well water in an amount sufficient to kill said well and in a further amount sufficient to reduce the oil saturation in the formation for a distance of at least two feet surrounding said well.

5. The method of claim 1 wherein prior to step (a) there is injected a solvent for liquid hydrocarbons via said well into said formation.

6. The method of claim 5 wherein said solvent for liquid hydrocarbons is an aromatic hydrocarbon solvent.

7. In a method of treating a subsurface formation containing hydrocarbons and water in the pore spaces thereof wherein an aqueous solution of an acid is injected into the formation to improve the permeability thereof, said formation being penetrated by a well extending from the surface of the earth, the improvement comprising:
   injecting an amphipathic solvent via said well into said formation in an amount sufficient to replace said hydrocarbons and said water from a portion of said formation;
   injecting an aqueous solution of an acid via said well into said formation to improve said permeability thereof and to water-wet said formation from which said amphipathic solvent was displaced; and
   injecting a fluid that is immiscible with said aqueous solution of an acid and that has a viscosity less than the viscosity of said aqueous solution of an acid via said well into said formation to develop water-wet channels filled with the immiscible fluid and which channels extend beyond said aqueous solution of an acid and said amphipathic solvent in said formation.

8. In the method of claim 7 wherein said hydrocarbons contained in said formation are liquid hydrocarbons, the injected fluid that is immiscible with said aqueous solution of an acid and has a viscosity less than the viscosity of said aqueous solution of an acid is an oil.

9. In the method of claim 7 wherein said hydrocarbons contained in said formation are gaseous hydrocarbons, the injected fluid that is immiscible with said aqueous solution of an acid and has a viscosity less than the viscosity of said aqueous solution of an acid is a gas.

10. In a method of treating a subsurface formation containing hydrocarbons and water in the pore spaces thereof wherein an aqueous solution of an acid is injected into the formation to improve the permeability thereof, said formation being penetrated by a well extending from the surface of the earth, the improvement comprising:
   injecting a solvent for liquid hydrocarbons via said well into said formation in an amount between about 1 and 20 percent of the hydrocarbon pore volume of said formation into which said aqueous solution of an acid is injected and at a pressure less than the pressure required to fracture said formation;
   injecting an amphipathic solvent via said well into said formation in an amount sufficient to fill a cylindrical ring having a thickness of no greater than about 1 foot of said formation about said aqueous solution of an acid subsequently injected into said formation and at a pressure less than the pressure required to fracture said formation;

injecting an aqueous solution of an acid via said well into said formation in an amount determined in accordance with the formula below:

$$V_a = \pi r_a^2 h \phi$$

where $V_a$ = amount or volume of acid in cubic feet, $\pi = 3.1416$, $r_a$ = radius in feet measured from the longitudinal axis of the well of the cylindrical volume of formation to be filled with acid, $h$ = the vertical height in feet of the formation to be acidized, and $\phi$ = porosity of the formation, wherein said radius is predetermined and at a pressure less than the pressure required to fracture said formation to water-wet said formation from which said amphipathic solvent was displaced; and injecting a fluid that is immiscible with said aqueous solution of an acid and that has a viscosity less than the viscosity of said aqueous solution of an acid via said well into said formation at a pressure less than the pressure required to fracture said formation and in an amount to develop water-wet channels filled with the immiscible fluid and which channels extend beyond said aqueous solution of an acid and said amphipathic solvent in said formation.

* * * * *